United States Patent
Dold

(10) Patent No.: US 10,730,720 B2
(45) Date of Patent: Aug. 4, 2020

(54) METHOD FOR MONITORING ELEVATOR SYSTEM SUSPENSION APPARATUS

(71) Applicant: INVENTIO AG, Hergiswil (CH)

(72) Inventor: Florian Dold, Root (CH)

(73) Assignee: INVENTIO AG, Hergiswil (CH)

( * ) Notice: Subject to any disclaimer, the term of this patent is extended or adjusted under 35 U.S.C. 154(b) by 471 days.

(21) Appl. No.: 15/520,883

(22) PCT Filed: Sep. 11, 2015

(86) PCT No.: PCT/EP2015/070783
§ 371 (c)(1),
(2) Date: Apr. 21, 2017

(87) PCT Pub. No.: WO2016/062454
PCT Pub. Date: Apr. 28, 2016

(65) Prior Publication Data
US 2017/0334677 A1  Nov. 23, 2017

(30) Foreign Application Priority Data
Oct. 22, 2014 (EP) .................................... 14189831

(51) Int. Cl.
*B66B 7/12* (2006.01)
*B66B 5/00* (2006.01)
*G01L 5/10* (2020.01)
*B66B 1/34* (2006.01)

(52) U.S. Cl.
CPC .......... *B66B 5/0031* (2013.01); *B66B 1/3407* (2013.01); *B66B 7/1223* (2013.01); *G01L 5/10* (2013.01)

(58) Field of Classification Search
USPC ......................................................... 187/393
See application file for complete search history.

(56) References Cited

U.S. PATENT DOCUMENTS

| | | | |
|---|---|---|---|
| 4,817,761 A * | 4/1989 | Iwata ........................ | B66B 1/30 187/293 |
| 6,123,176 A * | 9/2000 | O'Donnell ............ | B66B 7/1215 187/393 |
| 7,123,030 B2 | 10/2006 | Robar et al. | |
| 8,807,286 B2 * | 8/2014 | Puranen ................ | B66B 5/0018 187/391 |
| 9,385,447 B2 | 7/2016 | Dold et al. | |
| 2002/0194935 A1 | 12/2002 | Clarke et al. | |

FOREIGN PATENT DOCUMENTS

| | | |
|---|---|---|
| CN | 103974892 A | 8/2014 |
| EP | 1357073 A1 | 10/2003 |
| EP | 2749521 A2 | 7/2014 |
| WO | 2013151525 A1 | 10/2013 |

* cited by examiner

*Primary Examiner* — Christopher Uhlir
(74) *Attorney, Agent, or Firm* — William J. Clemens; Shumaker, Loop & Kendrick, LLP

(57) ABSTRACT

A method monitors at least one suspension apparatus in an elevator system, wherein the suspension apparatus includes at least one electrically conducting tension load carrying member that is surrounded by an electrically insulating jacket. The method includes the steps of: repeated determination of a value of an electrical characteristic of at least one tension load carrying member or of a group of tension load carrying members; establishment of a mean value on the basis of the determined values; and comparison of the mean value established with a reference value.

18 Claims, 2 Drawing Sheets

METHOD FOR MONITORING ELEVATOR SYSTEM SUSPENSION APPARATUS

FIELD

The present invention concerns a method for monitoring at least one suspension means in an elevator system.

BACKGROUND

In elevator systems steel cables have conventionally been employed as the suspension means for purposes of suspending and/or driving an elevator car. In accordance with a further development of such steel cables, belt-type suspension means are also employed, which have tension load carrying members and a jacketing arranged about the tension load carrying members. However, such belt-type suspension means cannot be monitored by conventional means, because the tension load carrying members, which determine the fracture load of the suspension means, are not visible through the jacketing.

For purposes of monitoring such tension load carrying members in belt-type suspension means a test current can be applied onto the tension load carrying members. In the current circuit thus established, or in the plurality of current circuits thus established, a current flow or current strength, a voltage, an electrical resistance, or an electrical conductivity, are measured. On the basis of such a measured quantity conclusions can be drawn regarding the integrity, that is to say, the degree of wear, of the suspension means. If, for example, the diameter of a tension load carrying member is reduced as a result of breakages of individual wires, or by metallic wear, the electrical resistance of the said tension load carrying member increases.

U.S. Pat. No. 7,123,030 B2 discloses such a method for determining the degree of wear of a belt-type suspension means. On the basis of a specific electrical resistance of the electrically conducting tension load carrying members a breaking force is defined for the suspension means.

However, in such a monitoring method, as described in the prior art, only a general statement can be made concerning the state of a suspension means. Here interference factors such as temperature variations, electromagnetic radiation, movements of the means suspension, and similar, which have a direct influence on the electrical resistance of the tension load carrying member, are not sufficiently taken into account.

SUMMARY

It is therefore an object of the present invention to make available a method for monitoring a suspension means in an elevator system, which permits a more precise statement to be made concerning the state of the suspension means. It should also be possible to execute the method with cost-effective means.

For purposes of achieving the said object a method is firstly proposed for monitoring at least one suspension means in an elevator system. The suspension means comprises at least one electrically conducting tension load carrying member that is surrounded by an electrically insulating jacket. The method comprises the steps of: Repeated determination of a value of an electrical characteristic of at least one tension load carrying member, or of a group of tension load carrying members; establishment of a mean value on the basis of the determined values; and comparison of the established mean value with a reference value.

The said method has the advantage that interference factors acting in the short-term, which alter the electrical resistance of the tension load carrying member, have a smaller influence on the assessment of the state of the suspension means. By the establishment of a mean value the undesirable influence of such interference factors can be greatly reduced. If, for example, nine values are determined under normal conditions, and one value is determined under particular conditions with regard to electromagnetic radiation, temperature, and similar, the influence of this one strongly deviating value is reduced by the factor ten.

The reference value can, for example, be a predetermined value for the elevator system. In an alternative example of embodiment the reference value is determined before the elevator system is commissioned. Here the reference value can, for example, be established as a mean value based on a plurality of measured values.

In an advantageous example of embodiment the electrical characteristic is an electrical resistance. This has the advantage that by this means both reductions in cross-section of the tension load carrying members, and also an alteration of the electrical current circuit, such as occurs, for example, in the case of an electrical bridge between tensile load carrying members and an earthed item in the elevator system, can be detected.

In an advantageous example of embodiment between two and fifty, preferably between two and thirty, particularly preferably between two and ten values are determined in the case of repeated determination of the values. Depending upon the elevator system and its usage parameters, it can be logical to determine more or fewer values for the establishment of a mean value. In the case of elevator systems with many and often occurring interference factors, for example, a higher number of determined values can be advantageous for establishing the mean value.

In an advantageous example of embodiment the repeated determination of values is carried out within a week, or within a day, or within an hour, or within a minute. Here, too, a time interval can be selected for determining the values as a function of the elevator system in question and its usage parameters. Fundamentally, in the case of a shorter time interval, for example, in the case of a minute, short-term alterations of the electrical characteristic of the tension load carrying member can be better detected, but the influence of interference factors is greater. In the case of a longer time interval, for example, in the case of a day, on the other hand, short-term alterations in the electrical characteristic of the tension load carrying member cannot be detected so easily, but the influence of interference factors is less. Thus an appropriate time interval can be selected for the specific requirements for the monitoring of a specific elevator system.

In an advantageous example of embodiment the repeated determination of values is executed during at least two different states of the elevator system. The states of the elevator system can differ, for example, in the driving state of the elevator car, in the loading of the elevator car, in the position of the elevator car in a shaft, and similar.

Such determination of the values during two different states of the elevator system has the advantage that an undesirably strong influence of one state of the elevator can be reduced by the establishment of the mean value. Thus, for example, a particular location of the elevator car in the shaft can have an influence on the environmental temperature acting on the suspension means, since the temperature distribution in elevator shafts is often non-homogeneous. Or the activity of the drive machinery can have an influence on the electromagnetic fields to which the suspension means are subjected.

In an advantageous example of embodiment the repeated determination of values is carried out at regular intervals. This has the advantage that the determined values are homogeneously distributed at the time interval of the repeated determination. By this means a mean value that is as meaningful as possible can be achieved for the corresponding time interval.

In an advantageous example of embodiment an arithmetic mean is established during the establishment of the mean value. This has the advantage that by this means an average can be obtained from a plurality of determined values, wherein each value is equally weighted.

In a further advantageous example of embodiment a moving mean value is established during the establishment of the mean value. This can, for example, be a moving arithmetic mean value. A moving mean value has the advantage that a mean value can be provided at each point in time for purposes of assessing the state of the suspension means. For example, the ten last determined values in each case can be drawn upon for the establishment of the mean value.

In a further advantageous example of embodiment a weighted mean is established during the establishment of the mean value. This can, for example, be a weighted arithmetic mean. A weighted mean has the advantage that specific circumstances and requirements can be taken into account. Thus, for example, a value in the case of normal loading for the car can be weighted in a different manner from a value in the case of an extraordinarily high or low loading for the car. By this means a further reduction of the influence of undesirable interference factors on the assessment of the state of the suspension means can be achieved.

In an advantageous example of embodiment two or more established mean values are also compared with one another, in addition to the comparison with the reference value. Here the two or more established mean values can differ in terms of time interval of the determination, or in terms of a selection of tension load carrying members, or in terms of a number of determined values, or in terms of the manner in which the mean value is established. The advantage of this form of embodiment lies in the fact that by this means further items of information can be obtained which go beyond the information obtained from the comparison with the reference value.

In an advantageous example of embodiment the suspension means comprises at least three electrically conducting tension load carrying members in a common electrically insulating jacket. In an alternative advantageous example of embodiment the suspension means comprises just one electrically conducting tension load carrying member in an electrically insulating jacket. In a further alternative advantageous example of embodiment the suspension means comprises just two electrically conducting tension load carrying members in an electrically insulating jacket.

The method here disclosed for monitoring a suspension means in an elevator system can be employed in various types of elevator systems. Thus, for example, elevator systems can be employed with or without a shaft, with or without a counterweight, as can elevator systems with different transmission ratios. In this manner each suspension means in an elevator system, which comprises an electrically conducting tension load carrying member, which is surrounded by an electrically insulating jacket, can be monitored using the method here disclosed.

DESCRIPTION OF THE DRAWINGS

With the aid of figures the invention is described symbolically and in an exemplary manner in more detail. Here.

DETAILED DESCRIPTION

Figure 1:
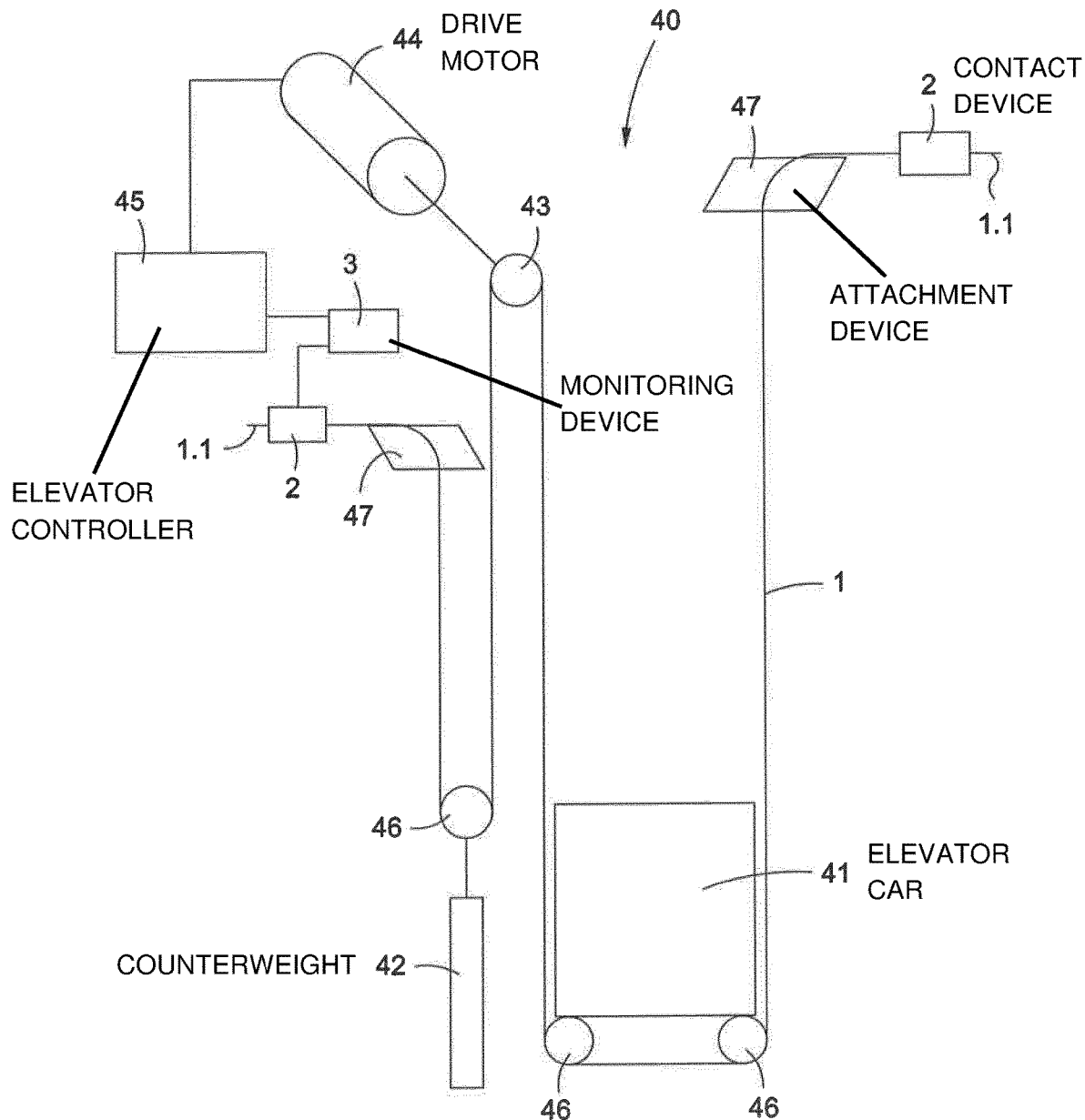
FIG. 1 shows an exemplary form of embodiment of an elevator system.

The elevator system 40 represented in a schematic and exemplary manner in FIG. 1 features an elevator car 41, a counterweight 42 and a suspension means or suspension apparatus 1, together with a drive pulley 43 with an associated drive motor 44. The drive pulley 43 drives the suspension means 1 and thus moves the elevator car 41 and the counterweight 42 in opposition. The drive motor 44 is controlled by an elevator controller 45. The car 41 is configured to accommodate people or goods, and to transport these between floors of a building. Car 41 and counterweight 42 are guided along guides (not represented). In the example the car 41 and the counterweight 42 are each suspended on load-bearing rollers 46. Here the suspension means 1 is secured to a first suspension means attachment device 47, and is then firstly guided around the load-bearing roller 46 of the counterweight 42. The suspension means 1 is then laid over the drive pulley 43, around the load-bearing roller 46 of the car 41, and is finally connected by means of a second suspension means attachment device 47 to a fixed point. This means that the suspension means 1 runs with a higher speed in accordance with a transfer factor over the drive 43, 44, than the car 41 or counterweight 42 move. In the example the transfer factor is 2:1.

A free end 1.1 of the suspension means or suspension apparatus 1 is provided with a contact device 2 for purposes of making temporary or permanent electrical contact with the tension load carrying members, and thus for purposes of monitoring the suspension means 1. In the example represented such a contact device 2 is arranged at both ends 1.1 of the suspension means 1. In an alternative form of embodiment, not represented, only one contact device 2 is arranged at one of the ends 1.1 of the suspension means, and the tension load carrying members are connected with one another at the other end 1.1 of the suspension means. The suspension means ends 1.1 are no longer loaded by the tensile force in the suspension means 1, since the said tensile force is already previously directed via the suspension means attachment devices 47 into the building. The contact devices 2 are therefore arranged in a region of the suspension means 1 that is not rolled over, and outside the loaded region of the suspension means 1.

In the example the contact device 2 is connected at one end 1.1 of the suspension means or suspension apparatus with a monitoring device 3. The monitoring device 3 thereby interconnects the tension load carrying members of the suspension means 1 as electrical resistances in an electrical connection for purposes of determining electrical resistances. The monitoring device 3 is also connected with the elevator controller 45. This connection can, for example, be designed as a parallel relay or as a BUS system. By this means a signal or a measured value from the monitoring device 3, can be transmitted to the elevator controller 45, in order to take account of the state of the suspension means 1, as determined by the monitoring device 3, in controlling the elevator 40.

By means of the monitoring device 3 an electrical characteristic of at least one tension load carrying member is repeatedly determined. A mean value is then established on the basis of the values determined, and the said established mean value is compared with a reference value. If a difference between the established mean value and the reference value is greater than a predefined threshold value, a signal can, for example, be sent to the elevator controller 45, which has as a consequence, for example, the discontinuation of a warning signal, or an immobilization of the elevator system.

The elevator system 40 shown in FIG. 1 is an example. Other transfer factors and arrangements, such as, for example, elevator systems without a counterweight, are possible. The contact device 2 for purposes of making contact with the suspension means or suspension apparatus 1 is then arranged in accordance with the positioning of the suspension means attachment devices 47.

Figure 2:
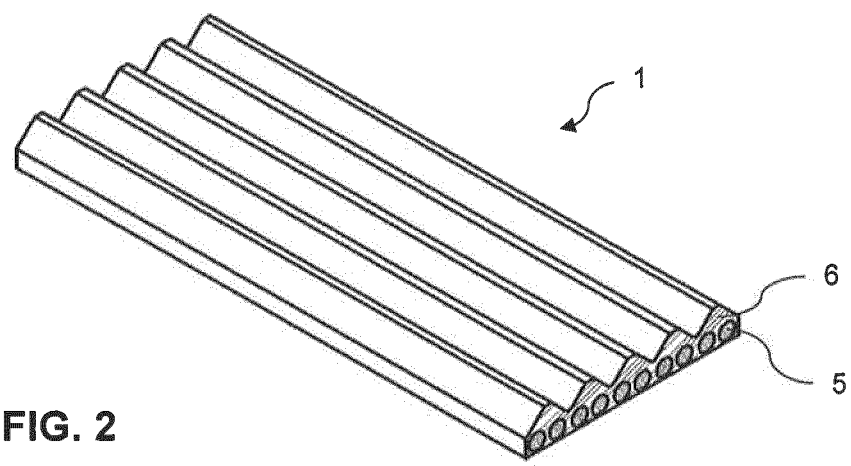
FIG. 2 shows an exemplary form of embodiment of a suspension means.

FIG. 2 represents a section of an exemplary form of embodiment of a suspension means or suspension apparatus 1. The suspension means 1 comprises a plurality of electrically conducting tension load carrying members 5 arranged parallel to one another, which are encased in a jacket 6. For purposes of making electrical contact with the tension load carrying members 5 the jacket 6 can, for example, be pierced or removed, or electrical contact can also be made with the tension load carrying members 5 on their end faces with a contact device 2. Furthermore, contact elements can also be fitted to the tension load carrying members 5, which then can be connected in a simple manner with the contact device.

In this example the suspension means or suspension apparatus is fitted with longitudinal ribs on a traction face. Such longitudinal ribs improve the traction characteristics of the suspension means 1 on the drive pulley 43, and at the same time ease the lateral guidance of the suspension means 1 on the drive pulley 43. The suspension means 1 can, however, be configured in another manner, for example, without longitudinal ribs, or with another number, or another arrangement, of the tension load carrying members 5. It is essential for the invention that the tension load carrying members 5 are configured so as to be electrically conducting.

Figure 3A:
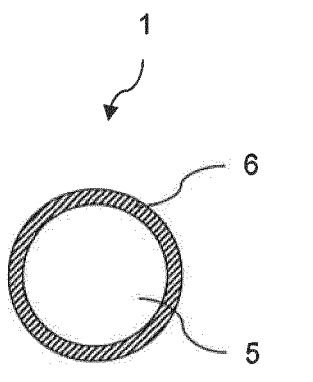
FIG. 3a shows an exemplary form of embodiment of a suspension means.

FIG. 3a represents a cross-section of a further exemplary form of embodiment of a suspension means or suspension apparatus 1. The suspension means 1 comprises an electrically conducting tension load carrying member 5, which is encased in a jacket 6. For purposes of making electrical contact with the tension load carrying member 5 the jacket 6 can, for example, be pierced or removed, or electrical contact can also be made with the tension load carrying members 5 on their end faces with a contact device 2.

Figure 3B:
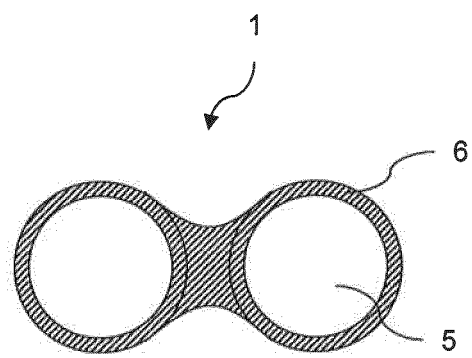
FIG. 3b shows an exemplary form of embodiment of a suspension means.

FIG. 3b represents a cross-section of a further exemplary form of embodiment of a suspension means or suspension apparatus 1. The suspension means 1 comprises two electrically conducting tension load carrying members 5, which are encased in a jacket 6. Here one tension load carrying member 5 is advantageously embodied in an S-twist, and the other tension load carrying member 5 in a Z-twist. By this means it is achieved that the torques that occur under load compensate one another, so that under load the suspension means is not pulled out of the groove of the drive pulley. For purposes of making electrical contact with the tension load-carrying members 5 the jacket 6 can, for example, be pierced or removed, or electrical contact can also be made with the tension load-carrying members 5 on their end faces with a contact device 2.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for monitoring at least one suspension apparatus in an elevator system, wherein the at least one suspension apparatus includes at least one electrically conducting tension load carrying member that is surrounded by an electrically insulating jacket, the method comprising the steps of:
   determination of a value of an electrical characteristic of the at least one tension load carrying member a predetermined number of times;
   establishment of a mean value on the basis of the determined values;
   comparison of the established mean value with a reference value, the reference value established as a mean value based upon a plurality of measured values;
   transmitting to an elevator controller of the elevator system a signal based upon the comparison and representing a state of the at least one suspension apparatus; and
   establishment of another mean value on the basis of the determined values, wherein comparison of the established mean value with the reference value further includes comparison of the established mean value, the established another mean value, and the reference value.

2. The method in accordance with claim 1 wherein the electrical characteristic is an electrical resistance of the at least one tension load carrying member.

3. The method in accordance with claim 1 wherein the predetermined number of times is between two and at least ten.

4. The method in accordance with claim 1 wherein the predetermined number of times is carried out within a range of a minute to a week.

5. The method in accordance with claim 1 wherein the predetermined number of times is carried out during at least two different states of the elevator system.

6. The method in accordance with claim 5 wherein the at least two different states of the elevator system differ while the elevator system is in a driving state of an elevator car suspended by the at least one suspension apparatus.

7. The method in accordance with claim 5 wherein the at least two different states of the elevator system differ in a loading of an elevator car suspended by the at least one suspension apparatus.

8. The method in accordance with claim 5 wherein the at least two different states of the elevator system differ in a position of an elevator car suspended by the at least one suspension apparatus in a shaft of the elevator system.

9. The method in accordance with claim 1 wherein the determinations are carried out at regular intervals.

10. The method in accordance with claim 1 wherein during the establishment of the mean value an arithmetic mean is established.

11. The method in accordance with claim 1 wherein during the establishment of the mean value a moving mean value is established.

12. The method in accordance with claim 1 wherein during the establishment of the mean value a weighted mean is established.

13. The method in accordance with claim 1 wherein the at least one suspension apparatus includes at least three of the electrically conducting tension load carrying member in a common one of the electrically insulating jacket.

14. The method in accordance with claim 1 wherein the at least one suspension apparatus has only one of the electrically conducting tension load carrying member in the electrically insulating jacket.

15. The method in accordance with claim 1 wherein the at least one suspension apparatus has only two of the electrically conducting tension load carrying member in a common one of the electrically insulating jacket.

16. A method for monitoring at least one suspension apparatus in an elevator system, wherein the at least one suspension apparatus includes a plurality of electrically conducting tension load carrying members surrounded by a common electrically insulating jacket, the method comprising the steps of:

determination of a value of an electrical characteristic of the tension load carrying members a predetermined number of times;

establishment of a mean value on the basis of the determined values;

comparison of the established mean value with a reference value, the reference value established as a mean value based upon a plurality of measured values;

transmitting to an elevator controller of the elevator system a signal based upon the comparison and representing a state of the at least one suspension apparatus; and establishment of another mean value on the basis of the determined values, wherein comparison of the established mean value with the reference value further includes comparison of the established mean value, the established another mean value, and the reference value.

17. A method for monitoring at least one suspension apparatus in an elevator system, wherein the at least one suspension apparatus includes at least one electrically conducting tension load carrying member that is surrounded by an electrically insulating jacket, the method comprising the steps of:

determination of a value of an electrical characteristic of the at least one tension load carrying member a predetermined number of times;

establishment of a mean value on the basis of the determined values;

establishment of another mean value on the basis of the determined values;

comparison of the established mean value, the established another mean value, and a reference value; and transmitting to an elevator controller of the elevator system a signal based upon the comparison and representing a state of the at least one suspension apparatus.

18. The method in accordance with claim 17 wherein the reference value is established as a mean value based upon a plurality of measured values.

* * * * *